United States Patent [19]

Siddall

[11] 4,375,449
[45] Mar. 1, 1983

[54] ELECTRIC FURNACES

[75] Inventor: Michael Siddall, Pooraka, Australia

[73] Assignee: Sidchrome (S.E. Asia) Limited, Hong Kong, Hong Kong

[21] Appl. No.: 151,684

[22] Filed: May 20, 1980

[30] Foreign Application Priority Data

May 23, 1979 [AU] Australia .............................. PD8921

[51] Int. Cl.³ .............................................. C03B 5/027
[52] U.S. Cl. ........................................ 373/33; 373/76; 373/120; 373/8
[58] Field of Search .......................... 13/23, 6, 32, 25; 376/33, 76, 120, 122, 8

[56] References Cited

U.S. PATENT DOCUMENTS

| | | | |
|---|---|---|---|
| 775,654 | 11/1904 | Higgins | 13/32 |
| 1,202,837 | 10/1916 | Hechenbleikner | 13/32 |
| 1,217,306 | 2/1917 | Hechenbleikner | 13/32 |
| 2,122,469 | 6/1938 | Hitner | |
| 2,686,821 | 8/1954 | McMullen | 13/23 |
| 3,448,790 | 6/1969 | Maskall | 13/32 |
| 3,612,501 | 10/1971 | Berczynski | 13/32 |

Primary Examiner—Bernard Roskoski
Attorney, Agent, or Firm—Jay L. Chaskin

[57] ABSTRACT

An electric furnace for fusing of fusible metal/non-metal oxide compounds, for example slag, having a side wall of steel, a plurality of electrodes depending into the furnace, a coolant distributing conduit surrounding the furnace near its upper end, and a tapping valve located in the side wall of the furnace between its upper and lower ends, the furnace being operated by melting the slag to form a melt, the outer layer of which is in contact with the inner surface of the furnace side wall which is frozen by the chilled coolant flowing over the outer surface thereof, to thereby form a frozen slag lining on the side wall inner surface which is continuously replenished as it is depleted.

11 Claims, 4 Drawing Figures

ELECTRIC FURNACES

This invention relates to improvements in the method of fusing, in an electric furnace, those discrete fusible oxide compounds of metals/non-metals (for example, slag), which become electrically conductive when molten.

The invention further relates to improvements in electric furnaces which are useful for the fusing of those compounds, for example prior to the formation of insulating fibres.

BACKGROUND OF THE INVENTION

Slag which is sometimes used for the production of fibrous insulating material is a waste product from blast furnace operations, and can for example contain 39% CaO, 37% $SiO_2$, 18% $Al_2O_3$, 4% MgO, and some small quantity of $Fe_2O_3$ besides traces of other materials. Such material is somewhat similar to material from which the refractory bricks are made, and will actually dissolve or wash away the refractory bricks if the temperature is sufficient to ensure that the slag is free running. This is one of two reasons why electric furnaces are normally not used in the melting of slag before the slag is poured onto a spinning wheel for production of fibrous insulating material. The other reason is the difficulty of preventing clogging of an outlet, and an invention to overcome that other difficulty is the subject of a companion application.

Because of those two difficulties, slag is usually heated in a coke fired furnace, and as the slag melts it percolates through the coke bed and runs out an aperture in the base of the furnace.

The temperature at which the furnace runs can be as much as 1,600° C. (usually between 1,450° and 1,500° C.) and at this temperature, the steel walls of the furnace can be seriously damaged. Consequently, it is usual practice in a coke fired furnace to surround the furnace with a jacket through which water continually passes, and the water has the effect of chilling the slag which forms immediately adjacent the inner wall of the surface, so that the slag itself solidifies and forms its own refractory insulation. With age and the continual use, the steel wall of the furnace gradually deteriorates, but when it deteriorates to the point where water from the surrounding jacket can enter the furnace, the water will enter a furnace containing a relatively small amount of molten slag, and a relatively large amount of burning coke, the water then merely tending to quench combustion and chilling the contents of the furnace, and those contents must be then separately removed and the walls separately replaced.

This arrangement however, is entirely unsatisfactory for an electric furnace. If a wall of an electric furnace deteriorates to the point where water from a surrounding jacket can enter the electric furnace, explosion is likely to occur because of the relatively large amount of molten slag within that furnace, and the absence of large amounts of coke. For this reason, heretofore electric furnaces used in the fusing of slag have utilised linings of refractory bricks which are frequently replaced.

In the U.S. Pat. No. 1,946,083 of LAMBIE there was described a flux wall having tuck stones arranged to be air-cooled, in a gas fired glass furnace. The U.S. Pat. No. 2,042,660 to HULTON also described an air cooling arrangement for furnace walls.

U.S. Pat. No. 2,686,821 to McMULLEN described an electric furnace for melting inorganic refractory oxidic material which utilised a water cooling jacket. The danger of explosion referred to above does not exist in this arrangement, however, since the melt is confined to the upper portion of the container, and is decanted by tilting the container.

U.S. Pat. No. 2,790,019 STALEGO explains the difficulty encountered in the freezing of the melt adjacent a pouring spout, and uses the overflow principle in a refractory lined furnace.

Although BERCZYNSKI described in his U.S. Pat. No. 3,612,501 an annular water-cooling jacket, this was used for water-cooling a refractory lining, and, as said above, such linings are unsatisfactory in the fusing of metal oxides.

The main object of this invention is to provide improvements whereby an electric furnace can be used for production of fused oxide compounds for example, such as are used in the production of mineral fibre insulating batts, and can be used for a continuous production for a much longer period of time than in the "overflow" type furnaces of McMULLEN or STALEGO aforesaid.

BRIEF SUMMARY OF THE INVENTION

An electric furnace has a side wall of steel, and when the slag or other fusible oxide compounds of metals/non-metals are melted within the furnace, the outer layer of the melt which is in contact with the inner surface of the furnace side wall is frozen by chilling the outer surface of the furnace side wall with a stream of water flowing over the wall. This enables the slag to become its own "refractory lining" which is continuously replenished as it is depleted. In turn this enables the melt to be withdrawn continuously from a low locality in the furnace, so that the furnace can be recharged from the top, without interruption of production.

The slag layer adjacent the walls of the furnace can be maintained by always using the furnace under chilled wall conditions, but since there is no head of water as exists around a jacketed furnace, deterioration of the wall to the point where water can enter the furnace is of no consequence. Any such water which tends to enter the furnace will be immediately vapourised and the vapours expelled from within the furnace back into the stream of water flowing over the outside. Thus the risk of explosion is greatly reduced.

More specifically, the method of this invention consists of charging said furnace container with at least some of said fusible oxide compounds, establishing a melt of some of said oxide compounds in said furnace and passing electric current between electrodes and through said melt to thereby fuse further of said oxide compounds, and passing a stream of water over the outer surface of said side walls to thereby cool and freeze a layer of said fused compounds contiguous with the inner surface of the side wall.

An electric furnace in this invention comprises a base preferably of refractory material, and steel side walls defining a furnace container, a plurality of electrodes depending into the container, a coolant distributing conduit surrounding the container near its upper end, and a furnace discharge sleeve extending through said side wall between its upper and lower ends, the inner end of said sleeve terminating in the container a distance inward from the side wall.

In a preferred arrangement, a further discharge sleeve extending through the side wall is provided but located approximately in the plane of the furnace base. This second sleeve constitutes a tapping valve and allows iron for example which has been reduced to the metallic form and which settles at the lowermost part in the furnace, to be tapped off continuously or periodically during operation of the furnace.

BRIEF SUMMARY OF THE DRAWINGS

An embodiment of the invention is described hereunder in some detail with reference to and as illustrated in the accompanying drawings in which.

Figure 1:
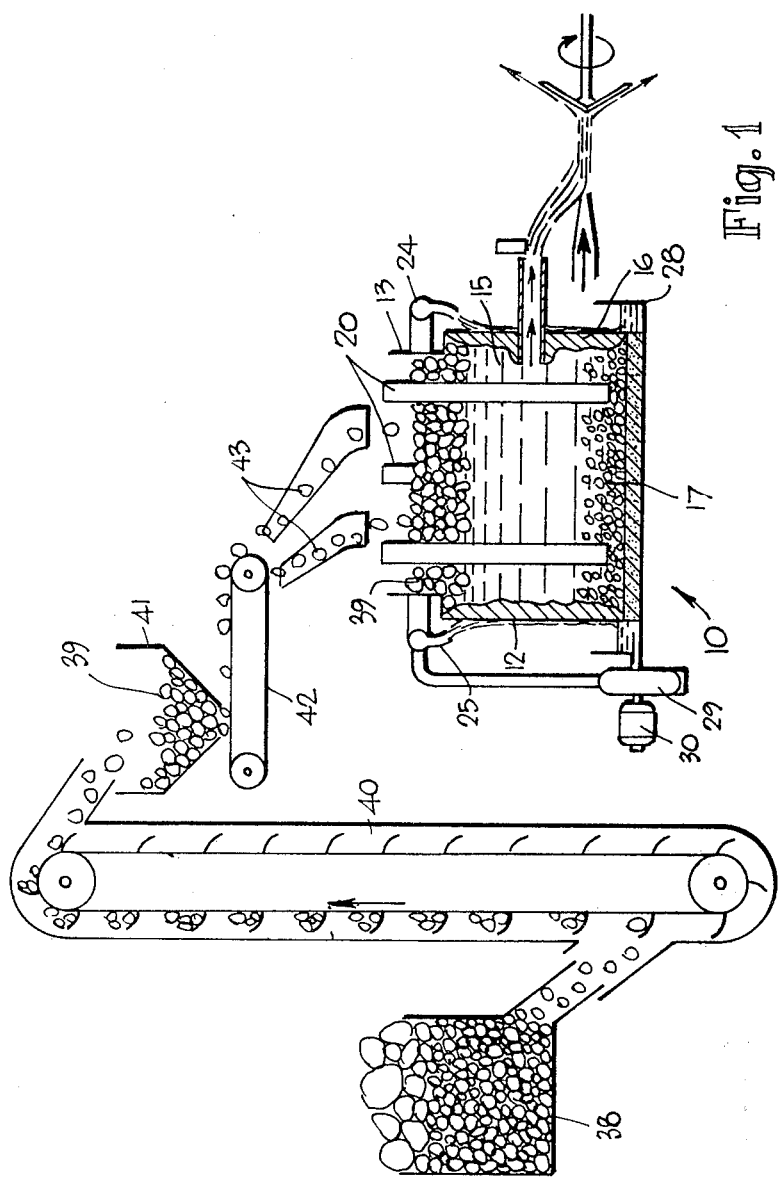
FIG. 1 is a diagrammatic layout showing an installation which includes an electric furnace in accordance with this invention.

In this embodiment the furnace described is intended for the melting of slag, and the furnace 10 comprises a refractory lined steel floor 11, a side wall 12 and a charging wall 13 surmounting the side wall 12. Although the floor 11 and the charging wall 13 can be made from other materials, the side wall 12 is of necessity made from steel. The space surrounded by the steel side wall 12 is a furnace container and contains the melt of fused material designated 15, a layer 16 contiguous with the inner surface of the side wall 12 of melt which has been frozen, and, for starting purposes, a layer 17 of coke or other carbonaceous material.

The furnace 10 has a plurality of electrodes 20 depending into it, the electrodes 20 being carbon rods which are connected by conductors 21 to a three-phase power transformer 22.

Located a little above and radially outwardly from the upper end of the side wall 12 is a circular coolant distributing conduit 24 which is provided with a plurality of depending tubes 25 each comprising an outlet for coolant, and arranged to direct coolant flow over the outer surface of the side wall 12. The side wall 12 is stiffened by a plurality of stiffening bars 27, and the depending tubes 25 are directed against the outer surface of the wall between the bars 27 and so spaced that, excepting where interrupted by the bars 27, a continuous film of coolant water passes over the outer surface of the side wall 12. The coolant runs into a sump 28, and is pumped upwardly by a pump 29 driven by motor 30 to be recirculated.

The side wall 12 has extending through it an annular water jacket sleeve 31 which is formed from thick stainless steel, and which also has water passing through it for cooling purposes. The sleeve 31 extends through the wall 12 to terminate at its inner end 32 a distance inwardly from the inner surface of the side wall 12, and at its outer end 33 a distance outward from the outer surface of that wall. The sleeve 31 contains a carbon liner 34 which is readily replaced. There is also provided a hinged valve member 36 which is also formed from stainless steel and also water-cooled, and this co-operates with the aperture through the liner 34 to control the outlet orifice and thereby control the rate of discharge of fused oxide compounds of metals from the melt within the container portion of the furnace.

Located at floor level, is a second tapping valve 37 comprising jacket sleeve 37'', and a carbon liner 37', and is of similar construction to valve 31, the valve 37 being used to tap and control iron which may settle to the bottom of the furnace.

Figure 2:
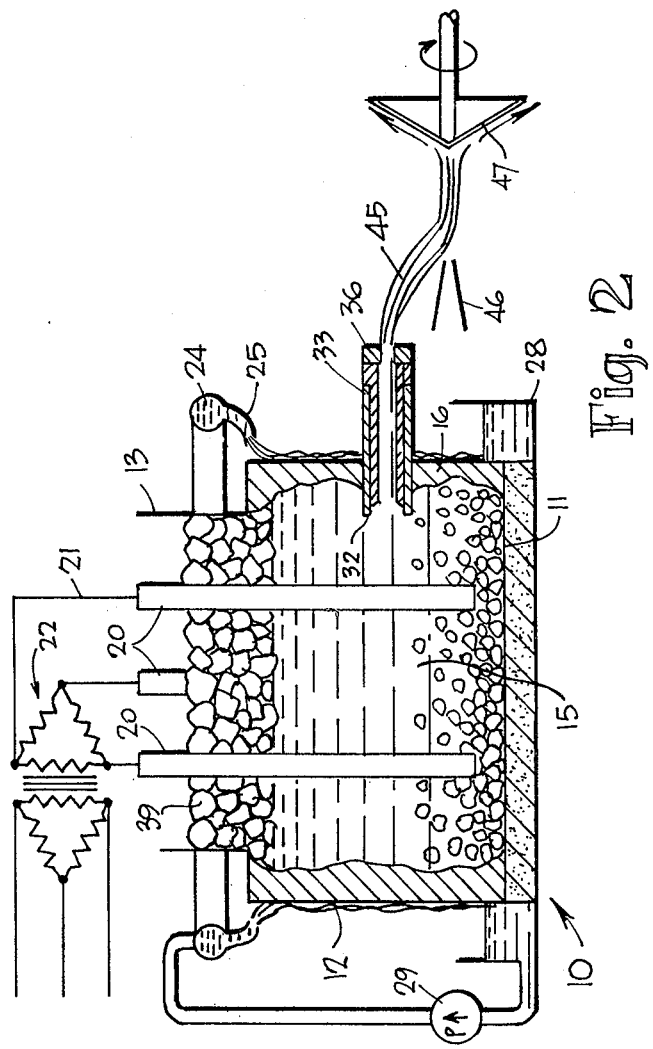
FIG. 2 is a diagrammatic section showing the electric furnace and the manner in which it is utilised.

Reference is now made to FIGS. 1 and 2, which between them illustrate the use of the furnace 10 in an installation. There is provided a crusher 38 which crushes the compounds into a suitable size, and for the fusing of granular slag, the size usually lies between $\frac{1}{4}$ and $\frac{1}{2}$ inch mesh. The discrete slag 39 is elevated by elevator 40 and discharged into a weighing hopper 41 (if required). The discrete slag 39 is then transported by a belt 42 (when required) to be charged into the charging space of the furnace 10 through chutes 43.

The invention is necessarily limited to those fusible oxide compounds of metals/non-metals which are conductive when in their molten state, and there are some uses of the invention wherein it is necessary for the melt to be established by "clean" means, for example by the use of gas-fired furnaces. However in the production of mineral fibre insulation batts or sheets, this is not a requirement and it is particularly convenient to establish a melt by firstly placing a quantity of coke 17 or other carbonaceous material into the base of the furnace, and heating that quantity of coke by the passage of electric current between the electrodes 20. Although this can be done after charging of the furnace with the particulate slag 39, it is preferred to separately heat the coke (which takes only a short period of time) and subsequently charge the furnace. The coke heats partly by electrical conductivity, partly by plasma heating and partly by combustion. When sufficient temperature has been reached, some particulate material is charged into the base of the container and this quickly establishes a melt due to its physical contact with the incandescent coke. Once the melt is thus established, the function of the coke ceases to be so critical, since the melt itself becomes conductive and the furnace can then be fully charged with the particulate slag which is progressively melted.

The passage of chilling water over the outer surface of the side wall 12 freezes a layer of the melt contiguous with the inner surface of the side wall 12 (and to top of the refractory floor), and this then functions as its own "refractory" and as the development and movement of further melt of fusible compounds takes place, although some of the layer is washed away it is automatically replenished. Since the inner end 32 of the sleeve 31 is positioned inwardly from the inner surface of the side wall 12, it can penetrate the melt and the tendency to block is substantially reduced. Since the outer end 33 of the sleeves 31 terminates outwardly from the outer surface of the wall 12, there is very little likelihood of chilling water encountering the melt as it passes outwardly through the liner 34. There is necessarily a deterioration of the steel side wall 12 of the furnace, but this deterioration ceases to constitute a danger since any water which penetrates the side wall 12 into the furnace merely encounters the frozen layer 16 of the compound, is vapourised and repelled.

Figure 3:
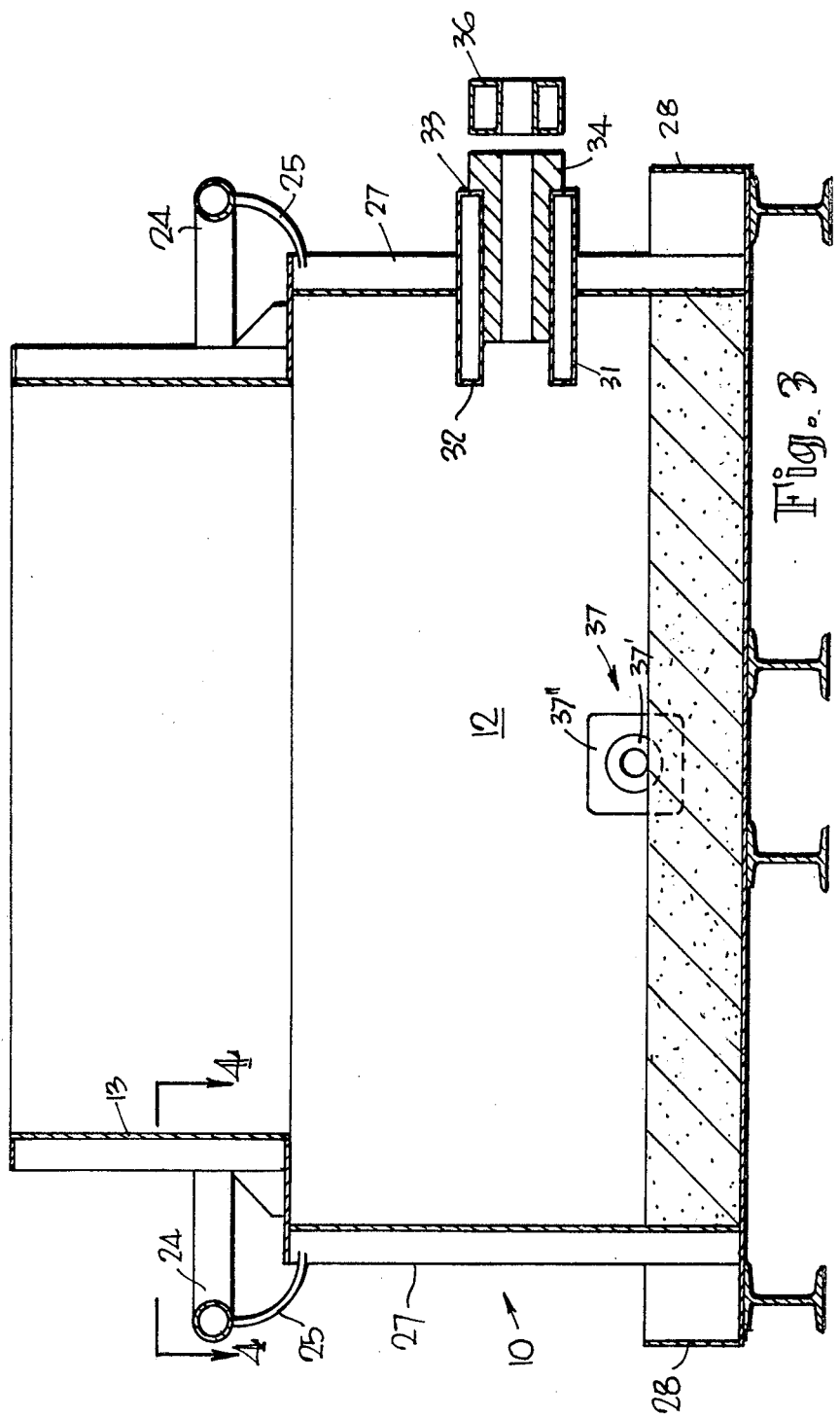
FIG. 3 is a constructional section through the furnace.
Figure 4:
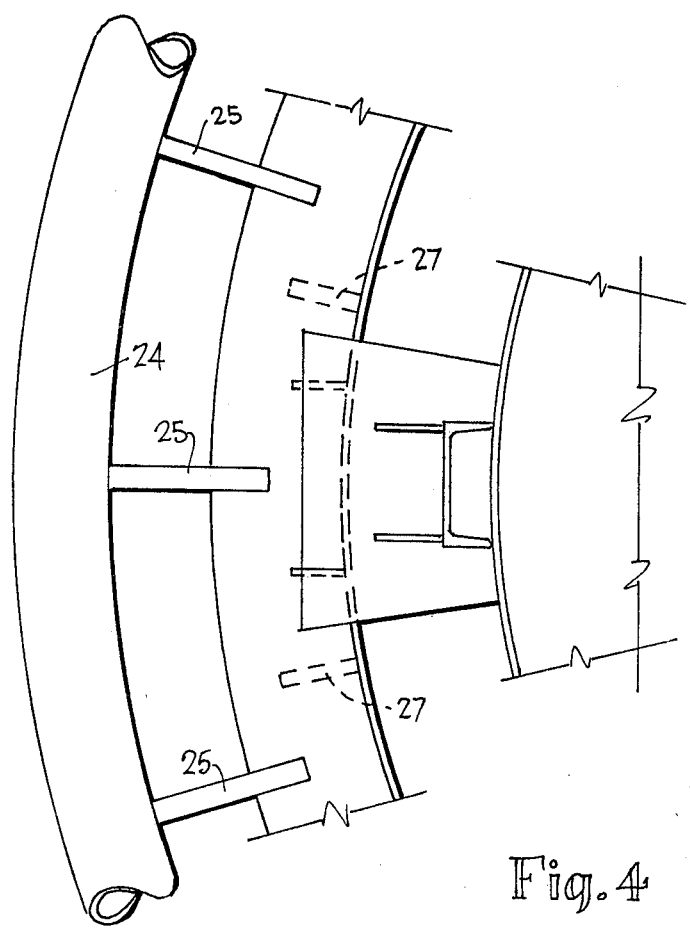
FIG. 4 is a fragmentary section taken on line 4—4 of FIG. 3.

As shown in FIG. 3 of the drawings, the refractory floor is also water-cooled by the water in the sump, this affording further protection by means of a mixed mass of the oxide compounds, iron and some molten refractory all in varying stages of solidification.

The fused compound flows outwardly through the sleeve 31 and its liner 34 as a continuous stream 45, and the stream intercepts a jet of air from a nozzle 46 to encounter a spinning discoid member 47 (which can be flat, conical or curved), and the mineral fibre is formed and packed in accordance with known art.

Iron which has been reduced to the metallic form and which settles in the hearth of the furnace can be tapped and controlled by the control valve situated at floor level.

Various modifications in structure and/or function and/or steps may be made by one skilled in the art to the disclosed embodiments without departing from the scope of the invention as defined by the claims.

I claim:

1. A method of fusing fusible oxide compounds of metal/non-metals in an electric furnace having a container with a steel side wall containing a plurality of electrodes, comprising:

charging said furnace container with at least some fusible oxide compounds, establishing an electrically conductive melt of some of said oxide compounds in said furnace and passing electric current between said electrodes and through said melt to thereby fuse further of said oxide compounds, passing a free-flowing continuous film of water downwardly over the outer surface of said side wall to thereby cool and freeze a layer of said fused compounds contiguous with the inner surface of the side wall, discharging said oxide compounds after having been fused from the container as a continuous stream through a discharge sleeve which extends through said side wall and said frozen layer into the melt, controlling the rate of discharge of said fused oxide compounds by adjustment of an adjusting flow control water-cooled valve on the outer end of said sleeve and further charging the oxide compounds in discrete form into the container to form a layer of fusible oxide compounds over the melt.

2. A method of fusing fusible oxide compounds of metals/non-metals in an electric furnace having a container with a base and side wall, a discharge sleeve in the wall adjacent to the base and a plurality of electrodes depending into the container to at least the level of the discharge sleeve, comprising the steps of:

(a) placing a quantity of discrete carbonaceous material in the furnace container and in contact with the electrodes;

(b) passing an electric current between the electrodes to heat the carbonaceous material;

(c) contacting the heated carbonaceous material with at least some of the fusible oxide compounds to thereby form an electrically conducting melt of the oxide compounds;

(d) subsequently charging the furnace container with further fusible oxide compounds to form and maintain a layer of fusible oxide compounds over the melt;

(e) passing a free-flowing continuous film of water downwardly over the outer surface of the side wall to thereby cool and freeze a layer of the fused compounds contiguous with the inner surface of the side wall; and (f) allowing the melt to flow as a stream through the discharge sleeve which extends thru said frozen layer.

3. The method according to claim 2 wherein prior to step (a) partially charging the furnace container with at least some of the fusible oxide compounds.

4. The method according to claim 2 wherein the stream is discharged through a control valve at on outer end of the discharge sleeve.

5. A method according to claim 1 or 2 comprising further charging of said oxide compounds in discrete form into said container from its upper end to replace said discharged stream.

6. A method according to claim 1 or 2 further comprising passing said stream of water over the outer surface of the side wall from a plurality of outlets of a coolant distributor conduit surrounding the side wall near its upper end.

7. A method according to claim 1 or 2 wherein a further discharge sleeve is provided approximately at the level of the base and comprising discharging high density molten compounds through said further discharge sleeve.

8. An electric furnace for the fusing of discrete fusible oxide compounds of metal/non-metals, comprising:

a base and side walls defining an open furnace container for a melt;

a furnace discharge sleeve extending through the side wall between its upper and lower ends and adjacent to the base, the inner end of the sleeve terminating in the container a distance inward from the side wall sufficient to penetrate the melt, the outer end of the discharge sleeve terminating a distance outward from the side wall;

a plurality of electrodes depending into the container at least to the level of the discharge sleeve; and a coolant distributing conduit means surrounding the container near its upper end, and having a plurality of discharge outlets directed towards the outer surface of the side wall for directing a free-flowing continuous film of coolant downwardly over the outer surface of the side wall where a frozen layer of fused compounds is formed contigious with the inner surface of the side wall.

9. An electric furnace according to claim 8 wherein the outer end of said discharge sleeve terminates a distance outwardly from the side wall, and further comprising a water cooled flow control valve co-operating with said outer end.

10. An electric furnace according to either claim 8 or claim 9 wherein said sleeve comprises an outer water jacket and an inner carbon liner.

11. An electric furnace according to claim 8 wherein the base is refractory lined and a second discharge sleeve extending through the side wall is provided at or near to the level of the refractory floor.

* * * * *